United States Patent
Zerafati et al.

(10) Patent No.: US 7,015,261 B1
(45) Date of Patent: Mar. 21, 2006

(54) IMPACT MODIFIER COMBINATION FOR POLYMERS

(75) Inventors: Saeid Zerafati, Voorhees, NJ (US); Michael Q. Tran, Abington, PA (US); Nicolas Gruat, Montargis (FR); Claude Granel, Philadelphia, PA (US)

(73) Assignee: Arkema Inc., Philadelphia, PA (US)

( * ) Notice: Subject to any disclaimer, the term of this patent is extended or adjusted under 35 U.S.C. 154(b) by 562 days.

(21) Appl. No.: 10/010,636

(22) Filed: Nov. 5, 2001

Related U.S. Application Data

(60) Provisional application No. 60/249,504, filed on Nov. 17, 2000.

(51) Int. Cl.
*C08L 51/04* (2006.01)

(52) U.S. Cl. ......................................... 523/201; 525/70
(58) Field of Classification Search ................ 523/201; 525/70
See application file for complete search history.

(56) References Cited

U.S. PATENT DOCUMENTS

| 3,808,180 | A | * | 4/1974 | Owens ........................ 525/291 |
| 4,034,013 | A | * | 7/1977 | Lane ........................... 524/513 |
| 4,096,202 | A | * | 6/1978 | Farnham et al. ............... 525/64 |
| 4,376,843 | A |   | 3/1983 | Lindner et al. |
| 5,045,595 | A |   | 9/1991 | Wang |
| 5,268,403 | A |   | 12/1993 | Sasaki et al. |
| 5,543,460 | A |   | 8/1996 | Yamamoto et al. |
| 5,723,551 | A | * | 3/1998 | Brown et al. ................ 525/391 |
| 5,773,520 | A |   | 6/1998 | Bertelo et al. |

FOREIGN PATENT DOCUMENTS

| EP | 269 324 | 6/1988 |
| EP | 326 038 | 1/1989 |
| FR | 2801599 A | 6/2001 |
| WO | WO 01 38437 | 5/2001 |

* cited by examiner

*Primary Examiner*—Jeffrey Mullis
(74) *Attorney, Agent, or Firm*—Thomas F. Roland

(57) ABSTRACT

An improved impact modifier for polymers, such as PBT and blends thereof; is disclosed. The impact modifier is a blend of (A) a core/shell additive having a core based on alkyl acrylate, on a polyorganosiloxane rubber or a blend thereof and a shell based on poly(alkyl methacrylate), or on a styrene-acrylonitrile copolymer grafted onto the core; and (B) a linear copolymer which contains from 50 to 85 parts of units derived from ethylene, from 5 to 40 parts of units derived from (meth)acrylic esters, and from 2 to 10 parts of a copolymerizable monomer containing an epoxy group. The impact strength provided by the impact modifier blend is unexpectedly higher than the impact strength provided by each individual component of the blend.

9 Claims, No Drawings

IMPACT MODIFIER COMBINATION FOR POLYMERS

REFERENCE TO RELATED APPLICATIONS

This application claims the benefit of U.S. Provisional Application Ser. No. 60/249,504, filed Nov. 17, 2000.

BACKGROUND OF THE INVENTION

1. Field of the Invention

The invention relates to an impact modifier additive blend comprised of a core/shell type impact modifier and a terpolymer impact modifier, and to polymeric compositions containing the blend.

2. Description of the Prior Art

Some synthetic resins are widely used as engineering plastics, for example in the building or automotive industries, in particular due to their low cost and to their good physical and/or chemical properties.

Nevertheless, they exhibit low impact strengths at ambient temperature or at low temperature or again also after ageing.

It has been proposed to overcome these defects by incorporating, in these resins, products known as impact additives which are generally polymers exhibiting a degree of elastomeric properties.

Many such additives are known, such as core/shell impact modifiers prepared in emulsion with a first stage or core of a polymer based on butadiene or on a poly(alkyl acrylate), and with one or more shells or second stages based on polymers which are mainly derived from methyl methacrylate, but which may also have polymer chains derived from vinyl aromatic monomers, such as styrene.

Another class of impact modifiers are rubbery linear polymers formed from ethylene, an alkyl acrylate such as ethyl or butyl acrylate, and a third monomer which has a copolymerizable double bond and an available reactive functionality, such as epoxide. A suitable monomer is glycidyl methacrylate (2,3-oxy-1-propyl methacrylate). These rubbery polymers probably are reactive with terminal hydroxyl or carboxyl groups in some resins. They improve the impact strength to some extent, but are known to raise the melt viscosity of the resin substantially, which is deleterious to molding and processing.

Therefore, the problem still exists to find a way to improve the impact strength of polymer without excessive loading of a core/shell modifier, or without increasing the melt viscosity of the blend to an extent where processing is slowed.

We have found that blends of a certain two types of impact modifiers within a certain compositional range offer several unexpected advantages.

First, the impact strength imparted by the blend of impact modifiers is unexpectedly higher than would be predicted by averaging values from blends where only one impact modifier is present. Secondly, the blend imparts acceptable impact strength values while producing a composition of acceptable melt viscosity for injection molding purposes. Thirdly, the blend imparts to the final polymeric composition a desirable combination of weatherability, impact modification and heat stability.

SUMMARY OF THE INVENTION

The impact additive of the present invention is a blend of:
(A) a core/shell additive comprised of core based on alkyl acrylate, on a polyorganosiloxane rubber or a blend thereof, and a shell based on poly(alkyl methacrylate), or on a styrene-acrylonitrile copolymer, characterized in that the said core/shell additive comprises from:
  (a) 70% to 90% by weight, and preferably 75% to 85%, of an elastomeric crosslinked core which is comprised of:
    1) of 20% to 100% by weight, and preferably of 20% to 90%, of a nucleus composed of a copolymer (I) of n-alkyl acrylate, the alkyl group of which has a carbon number ranging from 5 to 12, and preferably ranging from 5 to 8, or of a mixture of alkyl acrylates, the linear or branched alkyl group of which has a carbon number ranging from 2 to 12, and preferably ranging from 4 to 8, or of a polyorganosiloxane rubber, of a polyfunctional crosslinking agent possessing unsaturated groups in its molecule, at least one of which is of $CH_2=C<$vinyl type, and optionally of a polyfunctional grafting agent possessing unsaturated groups in its molecule, at least one of which is of $CH_2=CH-CH_{0.2}$—allyl type, the said nucleus containing a molar amount of crosslinking agent and optionally of grafting agent ranging from 0.05% to 5% and preferably an amount of between 0.5% and 1.5%;
    2) of 80% to 0% by weight, and preferably of 80% to 10%, of a covering composed of a copolymer (II) of n-alkyl acrylate, the alkyl group of which has a carbon number ranging from 4 to 12, and preferably ranging from 4 to 8, or of a mixture of alkyl acrylates as defined above in 1) and of a polyfunctional grafting agent possessing unsaturated groups in its molecule, at least one of which is of $CH_2=CH-CH_{0.2}$—allyl type, the said covering containing a molar amount of grafting agent ranging from 0.05% to 2.5% and preferably an amount of between 0.5% and 1.5%;
  (b) 30% to 10% by weight, and preferably 25% to 15%, of a shell grafted onto the said core composed of a polymer of an alkyl methacrylate, the alkyl group of which has a carbon number ranging from 1 to 4, or alternatively of a statistical copolymer of an alkyl methacrylate, the alkyl group of which has a carbon number ranging from 1 to 4, and of an alkyl acrylate, the alkyl group of which has a carbon number ranging from 1 to 8, containing a molar amount of alkyl acrylate ranging from 5% to 40%, and preferably of between 10% and 20%, or alternatively composed of a styrene-acrylonitrile copolymer having a preferred styrene:acrylonitrile molar ratio between 1:1 and 4:1, and particularly between 7:3 and 3:1, respectively; wherein optionally 0.1 to 50 weight percent of vinyl monomers have functional groups; and
(B) a linear terpolymer of (a) ethylene, (b) a lower alkylacrylate and (c) a monomer which contains a heterocycle containing one oxygen atom as the heteroatom.

A preferred embodiment of the invention is comprised of:
(A) 80–20% by weight of a core/shell additive comprised of:
   (1) 70–90% by weight of a cross linked elastomeric core compound of
      a) 20–100% by weight of a nucleus comprising a copolymer of n-octyl acrylate and 1,4-butanediol diacrylate, and
      b) surrounding said nucleus, 80–0% by weight of a covering comprising a copolymer of n-octyl acrylate and diallyl maleate, and
   (2) surrounding said core, 30–10% by weight of a shell grafted on to the said core, said shell composed of a polymer of an alkyl methacrylate, the alkyl group of which has a carbon number ranging from 1 to 4, or alternatively of a statistical copolymer of an alkyl methacrylate, the alkyl group of which has a carbon number ranging from 1 to 4, and of an alkyl acrylate, the alkyl group of which has a carbon number ranging from 1 to 8, containing a molar amount of alkyl acrylate ranging from 5% to 40%, or alternatively composed of a styrene-acrylonitrile copolymer, and,
(B) 20 to 80 weight percent of a linear copolymer which contains from 50 to 85 parts of units derived from ethylene, from 5 to 40 parts of units derived from a C1–C8 ester of (meth)acrylic acid, and from 2 to 10 parts of a copolymerizable monomer containing an epoxy group.

DETAILED DESCRIPTION OF THE INVENTION

The impact modifier compositions of the present invention are formulated to be blends containing (A) an acrylic core-shell impact modifier, most preferably, based on n-octyl acrylate (nOA) and methyl methacrylate (MMA) and (B) a terpolymer.

The acrylic core/shell impact modifier of the present invention is of the type described in U.S. Pat. No. 5,733,520 which is incorporated herein by reference.

The acrylic core/shell impact modifier is comprised of a core based on alkyl acrylate, on a polyorganosiloxane rubber or a blend thereof, and a shell based on poly(alkyl methacrylate), or on a styrene-acrylonitrile copolymer, characterized in that the said core/shell additive comprises from:
   (a) 70% to 90% by weight, and preferably 75% to 85%, of an elastomeric crosslinked core which is comprised of:
      1) of 20% to 100% by weight, and preferably of 20% to 90%, of a nucleus composed of a copolymer (I) of n-alkyl acrylate, the alkyl group of which has a carbon number ranging from 5 to 12, and preferably ranging from 5 to 8, or of a mixture of alkyl acrylates, the linear or branched alkyl group of which has a carbon number ranging from 2 to 12, and preferably ranging from 4 to 8, or of a polyorganosiloxane rubber, of a polyfunctional crosslinking agent possessing unsaturated groups in its molecule, at least one of which is of $CH_2=C<$ vinyl type, and optionally of a polyfunctional grafting agent possessing unsaturated groups in its molecule, at least one of which is of $CH_2=CH-CH_{0.2}$—allyl type, the said nucleus containing a molar amount of crosslinking agent and optionally of grafting agent ranging from 0.05% to 5% and preferably an amount of between 0.5% and 1.5%;
      2) of 80% to 0% by weight, and preferably of 80% to 10%, of a covering composed of a copolymer (II) of n-alkyl acrylate, the alkyl group of which has a carbon number ranging from 4 to 12, and preferably ranging from 4 to 8, or of a mixture of alkyl acrylates as defined above in 1) and of a polyfunctional grafting agent possessing unsaturated groups in its molecule, at least one of which is of $CH_{0.2}=CH-CH_2$—allyl type, the said covering containing a molar amount of grafting agent ranging from 0.05% to 2.5% and preferably an amount of between 0.5% and 1.5%;
   (b) 30% to 10% by weight, and preferably 25% to 15%, of a shell grafted onto the said core composed of a polymer of an alkyl methacrylate, the alkyl group of which has a carbon number ranging from 1 to 4, or alternatively of a statistical copolymer of an alkyl methacrylate, the alkyl group of which has a carbon number ranging from 1 to 4, and of an alkyl acrylate, the alkyl group of which has a carbon number ranging from 1 to 8, containing a molar amount of alkyl acrylate ranging from 5% to 40%, and preferably of between 10% and 20%, or alternatively composed of a styrene-acrylonitrile copolymer having a preferred styrene:acrylonitrile molar ratio between 1:1 and 4:1, and particularly between 7:3 and 3:1, respectively; wherein optionally 0.1 to 50 weight percent of vinyl monomers have functional groups.

Examples of functional groups-containing vinyl monomers include epoxy or glycidyl group-containing monomer such as glycidyl acrylate, glycidyl methacrylate, allyl glycidyl ether, 4,5-epoxypentylacrylate, 4,5-epoxypentylmethacrylate and butadiene monoepoxide, etc.; an hydroxy group containing-monomer such as hydroxyethyl acrylate or methacrylate etc.; a carboxy group-containing monomer such as acrylic acid, methacrylic acid, maleic anhydride, itaconic acid, etc.; an amide or amino group-containing vinyl compound such as acrylamide, N-methylol acrylamide or 2-dimethyl amino ethyl methacrylate, etc; or vinyl ester such as vinyl acetate etc. It could also be copolymerized.

Illustrative of n-alkyl acrylates which can be used according to the present invention to form the copolymer (a), are n-pentyl acrylate, n-hexyl acrylate, n-heptyl acrylate and very particularly n-octyl acrylate.

Illustrative of n-alkyl acrylates which can be used according to the present invention to form the copolymer (b), are n-butyl acrylate, n-pentyl acrylate, n-hexyl acrylate, n-heptyl acrylate and very particularly n-octyl acrylate.

The n-alkyl acrylate which may be used to form the copolymers (a) and/or (b) can be identical or different.

Illustrative of linear or branched alkyl acrylates which can be used according to the present invention for the formation of the mixtures of alkyl acrylates constituting the copolymers (a) and/or (b), of ethyl acrylate, n-propyl acrylate, n-butyl acrylate, amyl acrylate, 2-methylbutyl acrylate, 2-ethylhexyl acrylate, n-hexyl acrylate, n-octyl acrylate, n-decyl acrylate, n-dodecyl acrylate or 3,5,5-trimethylhexyl acrylate. Preferred are the linear alkyl acrylates.

According to an alternative form in accordance with the invention, the nucleus of the crosslinked elastomeric core can be composed entirely of or a blend of a polyorganosiloxane rubber obtained by emulsion polymerization of an organosiloxane in the presence of a crosslinking agent and, optionally, of a grafting agent.

Mention may be made, as illustration of organosiloxanes, of cyclic siloxanes composed of rings having a number of Si—C ring members ranging from 3 to 6, such as hexamethylcyclotrisiloxane, octamethylcyclotetrasiloxane, dodecamethylcyclotetrasiloxane or octaphenylcyclotetrasiloxane.

Mention may be made, as crosslinking agent which can be sued, of a crosslinking agent of the tri- or tetrafunctional silane type, such as, for example, trimethoxysilane or tetraethoxysilane.

Use will preferably be made, as grafting agent, of a methacryloyloxysiloxane of formula:

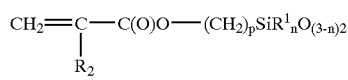

in which $R^1$ represents a methyl, ethyl, propyl or phenyl group, $R^2$ represents a hydrogen atom or a methyl group, n has a value 0, 1 or 2 and p is a number ranging from 1 to 6.

Mention may be made, as illustration of methacryloyloxysiloxane, of:
beta.-methacryloyloxyethyldimethoxymethylsilane,
gamma.-methacryloyloxypropylmethoxydimethylsilane,
gamma.-methacryloyloxypropyldimethoxysilane,
gamma.-methacryloyloxypropyltrimethoxysilane,
gamma.-methacryloyloxypropylethoxydiethylsi lane,
gamma.-methacryloyloxypropyldiethoxymethylsilane, and
delta.-methacryloyloxybutyldiethoxymethylsilane.

The polyorganosiloxane rubber can be produced by a process described, for example, in European Patent EP 0,326,038. Use will very particularly be made of the procedure described in the example of reference 1 of the said patent, which makes it possible to obtain a polyoctamethylcyclotetrasiloxane rubber latex.

A co-homopolymerization process of acrylic monomers and cyclic siloxane to form an Inter-Penetrated-Nerwork (IPN) could be performed similarly to the procedure described in U.S. Pat. No. 5,045,595.

According to this alternative from, the crosslinked elastomeric core can contain no more than 40% by weight of a nucleus composed of a polyorganosiloxane rubber as described above.

In the case where a mixture of alkyl acrylates is used to produce the copolymers (a) and/or (b), use will be made of an amount by weight of n-alkyl acrylate at least equal to 10% by weight of the mixture of alkyl acrylates and preferably an amount of between 20% and 80%.

As above, use may be made, to form the copolymers (a) and/or (b), of a mixture of identical or different alkyl acrylates.

According to the present invention, it is preferable to use n-alkyl acrylates and very particularly n-octyl acrylate to form the copolymers (a) and (b).

If a mixture of alkyl acrylates is used to form the copolymers (a) and/or (b), use will preferably be made of 20% to 80% by weight of n-octyl acrylate and preferably of 80% to 20% by weight of n-butyl acrylate or 2-ethyl hexyl acrylate.

Illustrative of alkyl methacrylates which can be used to form the shell grafted onto the crosslinked elastomeric core according to the present invention, of ethyl methacrylate, n-propyl methacrylate, isopropyl methacrylate, n-butyl methacrylate, isobutyl methacrylate, tert-butyl methacrylate and very particularly methyl methacrylate.

Examples of functional groups-containing vinyl monomers include an epoxy or glycidyl group-containing monomer such as glycidyl acrylate, glycidyl methacrylate, allyl glycidyl ether, 4,5-epoxypentylacrylate, 4,5-epoxypentylmethacrylate and butadiene monoepoxide etc.; an hydroxy group containing-monomer such as hydroxyethyl acrylate or methacrylate etc., a carboxy group-containing monomer such as acrylic acid, methacrylic acid, maleic anhydride, itaconic acid, etc.; an amide or amino group-containing vinyl compound such as acrylamide, N-methylol acrylamide or 2-dimethyl amino ethyl methacrylate, etc.; or vinyl ester such as vinyl acetate, etc.; which could also be copolymerized.

The crosslinking agent used to form the copolymer (a) can in particular be chosen from derivatives possessing at least two double bonds of the vinyl type or alternatively possessing one or a number of double bonds of the vinyl type and at least one double bond of the allyl type. Use will preferably be made of compounds possessing, in their molecules, a majority of double bonds of the vinyl type.

Illustrative of such crosslinking agents, of divinylbenzenes, 1,3 or 1,4-diisopropenyl benzene, polyalcohol (meth)acrylates, such as trimethylolpropane triacrylate or trimethacrylate, allyl acrylate or methacrylate, alkylene glycol diacrylates or dimethacrylates having 2 to 10 carbon atoms in the alkylene chain and in particular ethylene glycol diacrylate or dimethacrylate, 1,4-butanediol diacrylate or dimethacrylate or 1,6-hexanediol diacrylate or dimethacrylate, or polyoxyalkylene glycol diacrylate or dimethacrylate of formula

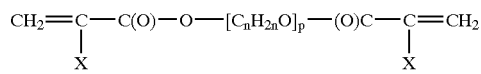

in which X represents a hydrogen atom or the methyl radical, n is an integer ranging from 2 to 4 and p is an integer ranging from 2 to 20 and in particular polyoxyethylene glycol diacrylate or dimethacrylate in which the polyoxyethylene radical has a molecular mass of approximately 400 (abovementioned formula with n=2 and p=9).

The grafting agent used to form the copolymer (b) can be in particular chosen from derivatives possessing at least two double bonds of the allyl type or alternatively possessing one or a number of double bonds of the allyl type and at least one double bond of the vinyl type.

Use will preferably be made of compounds possessing, in their molecules, a majority of double bonds of the allyl type.

Illustrative of such grafting agents, of diallyl maleate, diallyl itaconate, allyl methacrylate or acrylate, triallyl cyanurate, triallyl isocyanurate, diallyl terephthalate or triallyl trimesate.

A process for producing the core/shell additives used in the present invention comprises the preparation, in a first state, of a crosslinked core composed of a nucleus and of an optional covering and then, in a second stage, a poly(alkyl methacrylate) shell is grafted onto the said crosslinked core obtained in the first stage. The final core/shell particle size ranges from 0.04–1 µm but more preferably are between 0.1 and 0.6 µm.

According to a preferred method, the crosslinked core, composed of a nucleus and of an optional covering, is prepared and the grafting operation is carried out by using emulsion polymerization techniques. In this case, the following procedure can be used.

In a first stage, an emulsion is prepared which contains, per part by weight of monomers to be polymerized, 1 to 10 parts of water, 0.001 to 0.03 parts of an emulsifying agent, a major portion of the n-alkyl acrylate or of the mixture of alkyl acrylates as defined above to be polymerized in order to form the said core and at least one polyfunctional crosslinking agent. The reaction mixture thus formed is stirred and maintained at a temperature ranging from 55° C. to 65.° C. and preferably at a temperature in the region of 60° C. 0.001 to 0.5 parts of a catalyst which generates free radicals is then added and the reaction mixture thus formed is maintained at a temperature of, for example, between ambient temperature and 100° C. and with stirring for a period sufficient to obtain a virtually complete conversion of the monomers. The minor portion of n-alkyl acrylate or of the mixture of alkyl acrylates and the grafting agent, as well as, at the same time, 0.001 to 0.005 part of a catalyst which generates free radicals, are then added simultaneously to the phase thus obtained.

This optional second operation of the first stage, which comprises the production of the optional covering, is generally carried out at a temperature greater than that used for the preparation of the nucleus. This temperature is not greater than 100° C. and preferably between 60° C. and 90° C.

An alternative from of this first stage comprises the production of the crosslinked core in a single operation by simultaneously introducing the crosslinking agent and the grafting agent (or a compound which plays both the crosslinking role and the grafting role) into the reaction mixture.

In a second stage, the said core is grafted with an alkyl methacrylate. To do this, an appropriate amount of the said methacrylate is added to the reaction mixture resulting from the first stage, in order to obtain a grafted copolymer containing the desired content of grafted chains, as well as, if appropriate, additional amounts of emulsifying agent and of a radical catalyst also within the ranges defined above, and the mixture thus formed is maintained at a temperature within the abovementioned range, with stirring, until virtually complete conversion of the grafting monomers is obtained.

Use may be made, as emulsifying agent, of any one of the known surface-active agents, whether anionic, nonionic or even cationic. In particular, the emulsifying agent may be chosen from anionic emulsifying agents, such as sodium or potassium salts of fatty acids, in particular sodium laurate, sodium stearate, sodium palmitate, sodium oleate, mixed sulphates of sodium or of potassium and of fatty alcohols, in particular sodium lauryl sulphate, sodium or potassium salts of sulphosuccinic esters, sodium or potassium salts of alkylarylsulphonic acids, in particular sodium dodecylbenzenesulphonate, and sodium or potassium salts of fatty monoglyceride monosulphonates, or alternatively from nonionic surfactants, such as the reaction products of ethylene oxide and of alkylphenol or of aliphatic alcohols, alkylphenols. Use may also be made of mixtures of such surface-active agents, if need be.

The catalysts capable of being employed, both in the abovementioned first emulsion polymerization stage and in the abovementioned second emulsion polymerization stage, are compounds which give rise to free radicals under the temperature conditions chosen for the polymerization. These compounds can in particular be peroxide compounds, such as hydrogen eroxide; alkali metal persulphates and in particular sodium or potassium persulphates; ammonium persulphate; percarbonates; peracetates, perborates; peroxides such as benzoyl peroxide or lauroyl peroxide; or hydroperoxides such as cumene hydroperoxide, diisopropylbenzene hydroperoxide, para-menthane hydroperoxide or tert-butyl hydroperoxide.

However, it is preferable to use catalytic systems of redox type formed by the combination of a peroxide compound, for example as mentioned above, with a reducing agent, in particular such as alkali metal sulphite, alkali metal bisulphite, sodium formaldehyde sulphoxylate ($NaHSO_2HCHO$), ascorbic acid, glucose, and in particular those of the said catalytic systems which are water-soluble, for example potassium persulphate/sodium metabisulphite or alternatively diisopropylbenzene hydroperoxide/sodium formaldehyde sulphoxylate.

It is also possible to add, to the polymerization mixture of one and/or other of the stages, chain-limiting compounds, and in particular mercaptans such as tert-dodecyl mercaptan, isobutyl mercaptan, n-octyl mercaptan, n-dodecyl mercaptan or isooctyl mercaptopropionate, for the purpose of controlling the molecular mass of the core and/or of the chains grafted onto the nucleus, or alternatively compounds such as phosphates, for the purpose of controlling the ionic strength of the polymerization mixture.

The reaction mixture obtained on conclusion of the second emulsion polymerization stage, which is composed of an aqueous emulsion of the additive according to the invention, is then treated in order to separate the said additive therefrom. To do this, it is possible, for example, to subject the emulsion, according to the surfactant used, to a coagulating treatment by bringing into contact with a saline solution ($CaCl_2$ or $AlCl_3$) or a solution acidified with concentrated sulphuric acid and then to separate, by filtration, the solid product resulting from the coagulating, the said solid product then being washed and dried to give a graft copolymer as a powder. It is also possible to recover the additive contained in the emulsion by using a spray-drying technique.

The resulting additive exists in the form of a powder, the particle size of which can range from a few microns, for example 0.05 to 5 microns, to 200 to 300 microns, the said particle size depending on the technique used to separate the graft copolymer from the emulsion polymerization mixture.

The second component of the blend is a linear terpolymer of (a) ethylene, (b) a lower alkylacrylate and (c) a monomer which contains a heterocycle containing one oxygen atom as the hetero-atom.

The terpolymer is preferably comprised of 55–75% of the terpolymer is derived from ethylene, 20–30% of the terpolymer is derived from a lower alkyl acrylate, and 5–15% of the terpolymer is derived from monomer (c), it being understood that the sum of the three percentages is 100.

By "lower alkyl acrylate" is understood here a C1–8, preferably C1–4 alkyl ester of acrylic or methacrylic acid.

Preferably the lower alkylacrylate of the terpolymer is methyl acrylate and/or the monomer containing a heterocycle contains an epoxy group.

Component (c) can contain the heterocycle as part of the main polymer chain or in a pendant group. An example of the first possibility is maleic anhydride, and a particularly suitable pendant heterocylic group is the glycidyl residue. A particularly preferred monomer (c) is glycidyl methacrylate.

An especially preferred composition is about 70% ethylene, about 25 to about 30% of ethyl acrylate, and 2 to 8% of glycidyl methacrylate. A preferred melt index for the linear copolymer is from about 6 to about 8 grams/10 minutes, measured at 190 DEG C at 16 kg. load.

Some of these terpolymers are commercially available and all these terpolymers will be produced according to well-known processes. Commercially available terpolymers useful in the present invention include ethylene/methylacrylate/glycidyl methacrylate sold under the tradenames LOTADER by ATOFINA. For example, LOTADER AX 8900:is an ethylene-methyl acrylate-glycidyl methacrylate (GMA) copolymer comprising, by weight, 25% acrylate and 8% GMA, having an MFI of 6 (190° C./2.16 kg) and LOTADER AX 8930 is an ethylene-methyl acrylate-glycidyl methacrylate (GMA) copolymer comprising, by weight, 25% acrylate and 3% GMA, having an MFI of 6 (190° C./2.16 kg). Also available is a LOTADER grade with maleic anhydride.

The weight ratio between the core/shell and the terpolymer can vary within wide limits, but is preferably 80–20% of the core/shell and 20 to 80% of the terpolymer, more preferably 40–70% of the core/shell and 60 to 30% of terpolymer, and most preferably about 50% of each.

As mentioned hereinabove, the impact modifying synergistic mixture should be used in an impact modifying amount. This amount can also vary within wide limits, and will also depend on the influence on other physical properties which can be tolerated.

In general the synergistic combination of the present invention will be used in a total amount of 10 to 50 weight percent of the composition, preferably 15 to 40%.

The invention also relates to a composition comprising a polymer and the impact additive as defined above. Preferably the polymer is thermoplastic.

The thermoplastic polymer preferably is composed of one or a number of polymers of the polycondensates type, in particular polyamides, polyetheresteramides (PEBAX), polyesters, such as polybutylene terephthalate, polyethylene terephtalate, poly(ethylene-2,6-naphthalate (PEN), polypropylene terephthalate (PPT), polybutylene naphtalate (PBT), poly(1,4-cyclohexanedimethanol terephthalate) (PCT), polyethylene naphthalate bibenzoate (PENBB), polybutylene naphtalate (PBN), liquid crystalline polymers (LCP), copolyesters, polycarbonates or alloys of the abovementioned polymers, such as alloys of polycarbonates and of polyesters, such as XENOY.

The thermoplastic polymer can also be composed of one or a number of polyamides or their compounds with polyolefines or polyesters.

The thermoplastic polymer is preferably a poly(ethelene terephthalate), a poly(butylene terephthalate) or a poly(ethylene terephthalate), polycarbonate compound such as Xenoy GE Plastics.

The preferred content of impact additive incorporated in the thermoplastic polymer is between 1 and 50 parts by weight, and preferable between 5 and 40 parts by weight, most preferred about 25 to 30 parts by weight, per 100 parts by weight of the thermoplastic polymer used.

The thermoplastic polyesters of the invention may also include, in addition to the impact modifier, slip agents, antiblocking agents, antioxidants, UV stabilizers and fillers. The fillers may be glass fibres, fire retardants, talc, chalk or clay.

The impact modifiers may be in powder, flake, or pellet form. They may be blended together before admixture with the polymer, or admixed with the polymer during melting and mixing in preparation either for direct molding or pelletization for later molding.

The blends may be pelletized and molded or extruded on conventional equipment.

The composition according to the invention can be prepared by any method which makes it possible to produce a homogeneous mixture containing a thermoplastic polymer, the impact additive according to the invention and optionally other additives. It is possible, for example, to dry-mix the ingredients constituting the resin composition, then to extrude the resulting mixture and to reduce the extrudate to pellets. When the thermoplastic polymer is obtained by emulsion polymerization, it may be convenient to mix the emulsion containing the additive according to the invention with the emulsion of the thermoplastic polymer and to treat the resulting emulsion in order to separate therefrom the solid product which it contains, as described above with respect to the separation of the additive.

As an example, extrusion may be carried out in a suitable extruder, such as a Leistritz co-rotating twin screw extruder. The extruder should be capable of screw speeds of 150–300 rpm and throughputs of at least 20 pounds per hour. The temperature profile from the hopper to the die ranged from 200° C. to 290° C., depending upon the resin melt temperature. The extruder may be fed separately with the resins, core/shell impact modifier and terpolymer or fed separately with the resins and the acrylic modifier composition. Alternatively, a dry blend of the ingredients can be fed into the extruder.

For PBT, the selected temperature may range from 200° C. to 260° C., for PBT/PC the temperature may range from 200° C. to 280° C. The material is compounded and pelletized. The pellets may then be injection molded into suitable parts. The temperature of the injection molder was varied between 200° C. to 290° C., the mold temperature was set between 100° C. to 175° C. and 15 to 30 seconds cooling time in an ASTM family mold which contained Izod bars and tensile bars according to ASTM standards D 256 for Izod tests and D638 for tensile tests.

Of course, the compositions of resin/blend may contain minor amounts of further usual additives, such as antioxidants, fillers, reinforcing fillers, stabilizers, dyes and pigments, plasticizers, mold release agents, lubricants, antistatic agents, flame retardants and the like.

Impact-modified poly(butylene terephthalate), as represented in this invention, is useful for transportation-related molded items, such as for automobiles, buses, motorcycles, trucks, airplanes, boats, and trains. Such parts are useful in bumpers, fenders, and crash helmets. The blends, often in combination with flame-retardants and/or glass fibers, are useful in the electrical sector, for plugs, connectors, boxes, and switches, and other uses where high strength and toughness are desirable. Such blends are also useful for appliances, such as computers, refrigerator housings, and television housings or casings.

The following examples illustrate the preferred compositions and methods of the invention. These examples are illustrative only and do not limit the scope of the invention. All percentages are by weight, unless otherwise indicated.

EXAMPLES

For the purposes of the data reported in Tables 1, 2, 3, standard ASTM tests were conducted on polyester compositions. For example, notched Izod are reported as ft-lb/in; Young's modulus is reported in kpsi; elongation at break and yield strain are reported in percentage; yield stress and ultimate tensile stress are reported in psi. These characteristics are tested using ASTM test designations identified below.

The process of compounding the poly(butylene terephalate) polyester (PBT) tested is achieved by first dry blending the polyester with the terpolymer in the proper proportions. The polyester/terpolymer blend is fed into the extruder in one feeder and the core/shell impact modifier is added from a second feeder to formulate the desired level of impact modifier system (core/shell and terpolymer). The compounding operation is performed using a Leistritz micro 27 twin screw corotating extruder followed by pelletization. The temperature of the extruder is set at 210° C. at the throat of the extruder and is ramped linearly to 255° C. at the die. The screws are set at 250 RPM and the extruder through put is 25 lb/hr. The pellets collected from extrusion are injection molded in an Arburg Allrounder with an ASTM family mold. The temperature profile for the injection molder is 200° C. at the throat with a linear ramp to 280° C. at the nozzle. The mold temperature is set at 70° C. The samples made from injection molding are tested for notched Izod using the ASTM D256 standard. The tensile data is collected using the ASTM D638 and the melt flow index is measured by using ASTM D1238.

The acrylic core/shell used in these examples are described in Table 1.

A terpolymer used in the examples is LOTADER AX 8900 which is an ethylene-methyl acrylate-glycidyl methacrylate (GMA) copolymer comprising, by weight, 25% acrylate and 8% GMA, having an MFI of 6 (190° C./2.16 kg).

Another terpolymer used in the examples is LOTADER AX 8930 which is an ethylene-methyl acrylate-glycidyl methacrylate (GMA) copolymer comprising, by weight, 24% acrylate and 3% GMA, having an MFI of 4 g/min (190° C./2.1 kg (ASTM D1238).

The poly(butylene terephalate) is Celanex 1600A which is a high molecular weight extrusion and injection molding grade with the melt flow index of 8.4 g/10 min.

Table 1 indicates the composition of the various core/shell additives and terpolymer additives of the examples.

TABLE 1

| | | Modifier Characteristics | | | |
|---|---|---|---|---|---|
| Modifier | Additive type | Composition | Core/shell ratio | Particle size ($\mu$m) | GMA (wt %) |
| A | AX 8900 | E-MA-GMA | — | — | 8 |
| B | AX 8930 | E-MA-GMA | — | — | 3 |
| C | Core/shell | nOA/MMA | 80/20 | 0.3 | 0 |
| D | Core/shell | nOA/MMA | 75/25 | 0.3 | 0 |
| E | Core/shell | nOA/MMA-GMA | 75/25 | 0.3 | .1–3 |

E: Ethylene;
MA: Methyl Acrylate;
GMA: Glycidyl Methacrylate;
nOA: n-Octyl Acrylate;
MMA: Methyl Methacrylate Table 2 shows the impact properties of pure PBT and its compounds with individual ingredients. Example 1 shows that pure PBT is 100% brittle at room temperature with a low impact strength. In example 2, addition of 20% Lotader substantially improves the room temperature impact however, the material is 100% brittle at −20° C. Addition of more than 20% Lotader produces a very high viscosity material which is hard to process. In examples 3 and 4, 25% of modifiers C and E are added to PBT, respectively. For unfunctionalized material, although the impact strength is increased compared to unmodified PBT, it is still 100% brittle at room temperature. In the functionalized case, material is 100% ductile down to −20° C.

TABLE 2

Comparative PBT (Celanex 1600) Impact Evaluation (notched Izod)

| Example | Modifiers | C/S (wt %) | Terpolymer (wt %) | Izod RT (% Ductile; ft-lb/in) | Izod −20 C (% Ductile; ft-lb/in) | Izod −30 C (% Ductile; ft-lb/in) | Izod −40 C (% Ductile; ft-lb/in) |
|---|---|---|---|---|---|---|---|
| 1 | None | 0 | 0 | 0–1 | — | — | — |
| 2 | A | 0 | 20 | 100–17.6 | 0–2.9 | — | — |
| 3 | C | 25 | 0 | 0–3.1 | — | — | — |
| 4 | E | 25 | 0 | 100–16.3 | 100–16.8 | 50–10.4 | — |

In Table 3, the synergistic effect of the combination of core/shell and terpolymer on the impact strength is dempnstrated. Comparing example 5 with examples 2 and 3 shows that the cold temperature impact of the combination of additive A and C is superior to the cold temperature of each individual one. In particular this is more obvious for formulations with unfunctionalized core/shell impact modifiers. In example 6, 25% addition of the modifier mixture at equal ratios, produces the best cold temperature impact which is 100% ductile at −40° C. with an impact strength of 18.9 ft-lb/in.

TABLE 3

Impact Evaluation (notched Izod) of PBT (Celanex 1600) Modified with a blend of Core-shell and Terpolymer

| Example | Modifiers | C/S (wt %) | Terpolymer (wt %) | Izod RT (% Ductile; ft-lb/in) | Izod −20 C (% Ductile; ft-lb/in) | Izod −30 C (% Ductile; ft-lb/in) | Izod −40 C (% Ductile; ft-lb/in) |
|---|---|---|---|---|---|---|---|
| 5 | A + C | 20 | 5 | 100–21.5 | 100–18.6 | 0–4.5 | 0–3.3 |
|   |   | 17.5 | 7.5 | 100–22.0 | 100–20.5 | 100–17.7 | 0–3.0 |
|   |   | 15 | 10 | 100–22.1 | 100–19.0 | 0–4.5 | 0–3.0 |
|   |   | 12.5 | 12.5 | 100–22.8 | 100–21.7 | 100–16.1 | 0–3.2 |
| 6 | A + D | 17.5 | 7.5 | 100–23.3 | — | 100–17.9 | 86–18.6 |
|   |   | 15 | 10 | 100–24.3 | — | 100–21.9 | 86–15.7 |
|   |   | 12.5 | 12.5 | 100–25.6 | — | 100–22.5 | 100–18.9 |
| 7 | A + E | 20 | 5 | 100–21.1 | 100–16.2 | 0–3.6 | — |
|   |   | 17.5 | 7.5 | 100–21.1 | 50–11.5 | 0–3.2 | — |
|   |   | 15 | 10 | 100–22.2 | 0–5.1 | 0–3.1 | — |
|   |   | 12.5 | 12.5 | 100–22.7 | 0–3.8 | 0–2.9 | — |
| 8 | B + D | 17.5 | 7.5 | 100–21.5 | 100–17.9 | 0–3.2 | — |
|   |   | 12.5 | 12.5 | 100–20.2 | 87–15.9 | 0–3.2 | — |

Table 4 shows the notched Izod impact strengths of the materials in examples 6, 2 and 4 when exposed to 150° C. for 14 days as compared to the initial Izod impact strength. The material with the mixture of impact modifiers holds its impact strength better than the materials with only one impact modifier. This impact retention is very important for long term application of these material in high temperature applications such as automotive interior and underhood applications.

TABLE 4

Room Temperature Impact Retention (notched Izod) of Modified PBT (Celanex 1600).

| Example | Modifiers | C/S (wt %) | Terpolymer (wt %) | Initial Izod RT (% Ductile; ft-lb/in) | Izod RT after 14 days (% Ductile; ft-lb/in) |
|---|---|---|---|---|---|
| 6 | A + D | 12.5 | 12.5 | 100–25.0 | 100–21.8 |
| 2 | A | 0 | 20 | 100–18.5 | 100–16.2 |
| 4 | B | 25 | 0 | 100–16.1 | 100–10.1 |

Table 5 compares the tensile properties of several formulations. Examples 5 and 6 show that for the same total amount of additive, increasing the terpolymer to core/shell ratio, simultaneously improves ultimate strength and elongation at break. Comparing examples 5 and 3 in this table shows the dramatic improvement of the tensile properties of the impact modifier mixture over the material with only core/shell impact modifier content. This point is more obvious for a 25% loading of impact modifier formulation at equal core/shell to terpolymer ratios in examples 5 and 6

TABLE 5

Tensile Properties of PBT (Celanex 1600) Modified with a blend of Core-shell and Terpolymer

| Example | Modifiers | C/S (wt %) | Terpolymer (wt %) | Ultimate Stress (psi) | Elongation at break (%) | Young's Modulus (kpsi) |
|---|---|---|---|---|---|---|
| 5 | A + C | 20 | 5 | 4290 | 278 | 87.8 |
|   |   | 17.5 | 7.5 | 4730 | 413 | 85.7 |
|   |   | 12.5 | 12.5 | 5630 | 512 | 87.3 |

TABLE 5-continued

Tensile Properties of PBT (Celanex 1600) Modified with a blend of Core-shell and Terpolymer

| Example | Modifiers | C/S (wt %) | Terpolymer (wt %) | Ultimate Stress (psi) | Elongation at break (%) | Young's Modulus (kpsi) |
|---|---|---|---|---|---|---|
| 6 | A + E | 20 | 5 | 4610 | 370 | 86.2 |
|   |   | 17.5 | 7.5 | 5130 | 417 | 85.3 |
|   |   | 12.5 | 12.5 | 6050 | 568 | 86.4 |
| 1 | None | 0 | 0 | 4280 | 251 | 118.0 |
| 2 | A | 0 | 20 | 4750 | 63 | 91.0 |
| 3 | C | 25 | 0 | 3940 | 134 | 91.1 |
| 4 | E | 25 | 0 | 4640 | 310 | 106.6 |

Also, the preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

In this specification and the following claims, the expression "ranging from 7 to 9," e.g., from 5 to 12 and the like includes values x and y, e.g., 5 and 12. Also, the abbreviation "m.g." represents meter-gram(s).

What is claimed is:

1. An additive for improving impact resistance, said additive comprising a blend of:

(A) 80–20% by weight of a core/shell additive comprised of
  (1) 70–90% by weight of a cross linked elastomeric core compound of
    a) 20–100% by weight of a nucleus comprising a copolymer of n-octyl acrylate and 1,4-butanediol diacrylate, and
    b) surrounding said nucleus, 80–0% by weight of a covering comprising a copolymer of n-octyl acrylate and diallyl maleate, and
  (2) surrounding said core, 30–10% by weight of a shell grafted on to the said core, said shell composed of a polymer of an alkyl methacrylate, the alkyl group of which has a carbon number ranging from 1 to 4, and of an alkyl acrylate, the alkyl group of which has a carbon number ranging from 1 to 8, containing a molar amount of alkyl acrylate ranging from 5% to 40%,
(B) 20 to 80 weight percent of a linear terpolymer which contains from 50 to 85 parts of units derived from ethylene, from 5 to 40 parts of units derived from a C1–C8 ester of (meth)acrylic acid, and from 2 to 10 parts of a copolymerizable monomer containing an epoxy group.

2. An additive according to claim 1, wherein said nucleus is about 90% by weight of said core and, said covering is about 10% by weight.

3. An additive according, to claim 2, wherein said shell consists essentially of poly(methylmethacrylate).

4. An impact resistance additive according to claim 1, wherein said core/shell comprises from:
  a) 75% to 85% of said crosslinked elastomeric core,
  b) 25% to 15% of said shell grafted onto the said core.

5. An impact additive according to claim 1, wherein the covering of the crosslinked core has a molar amount of grafting agent of between 0.5°% and 1.5%.

6. An impact additive according to claim 1, characterized in that the alkyl methacrylate used to form the shell is methyl methacrylate.

7. An impact additive according to claim 1 wherein the C1–C8 ester of (meth)acrylic acid of the linear copolymer is methyl acrylate.

8. An impact additive according to claim 1 wherein the copolymerizable monomer containing an epoxy group or the linear copolymer is glycidyl methacrylate.

9. An impact modifier of claim 1, wherein the terpolymer is comprised of 55–75 parts of units derived from ethylene, 20–30 parts of units is derived from a lower alkyl acrylate, and 5–15 parts of units is derived from glycidyl methacrylate.

* * * * *